UNITED STATES PATENT OFFICE.

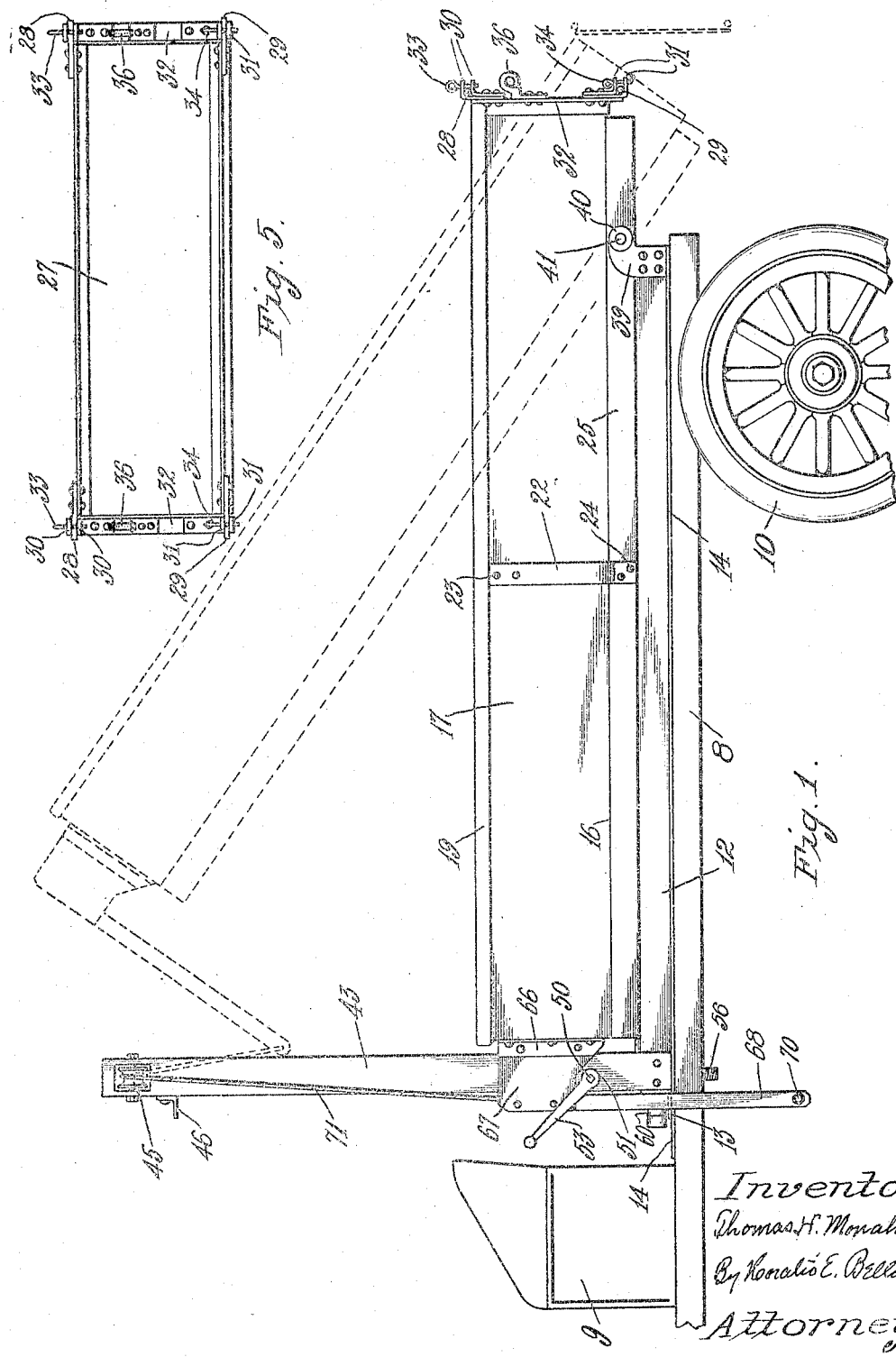

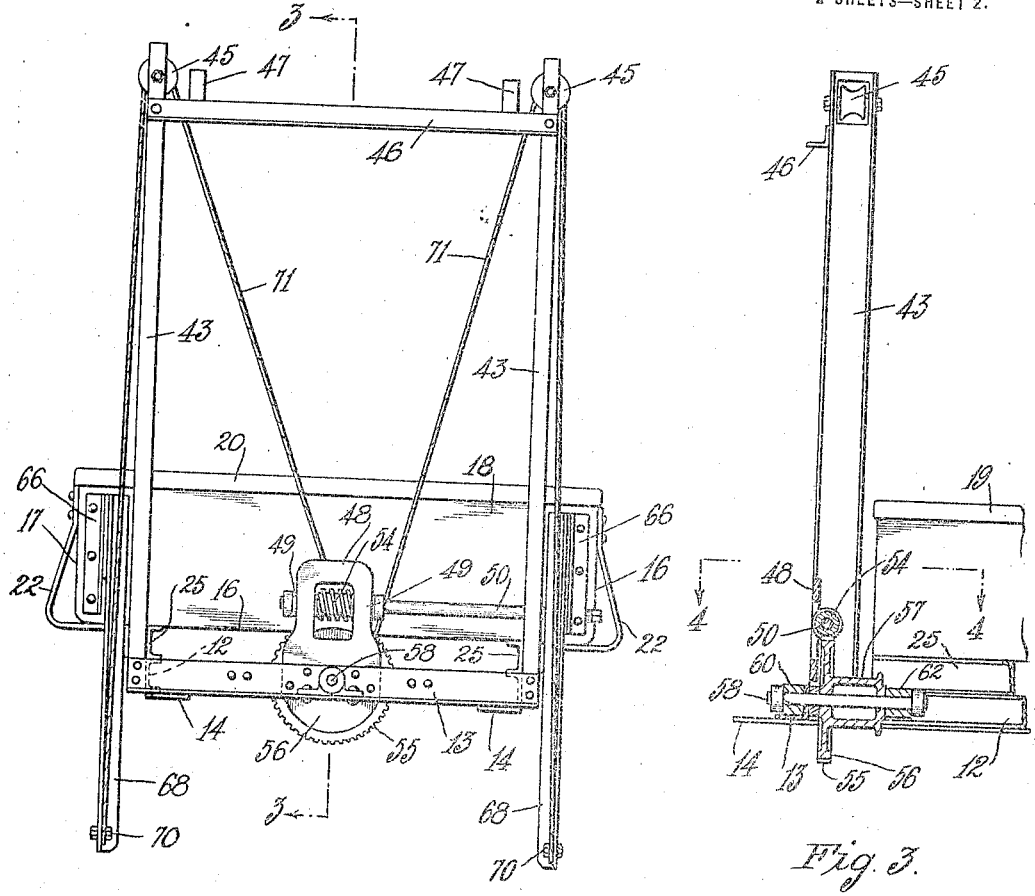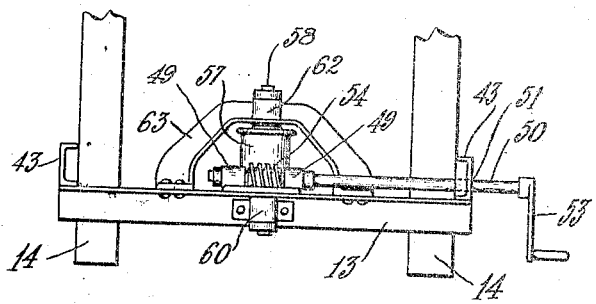

THOMAS H. MONAHAN, OF PROVIDENCE, RHODE ISLAND, ASSIGNOR, BY MESNE ASSIGNMENTS, TO PROVIDENCE BODY COMPANY, A CORPORATION OF RHODE ISLAND.

DUMPING-TRUCK.

1,302,406.  Specification of Letters Patent.  Patented Apr. 29, 1919.

Application filed October 29, 1917. Serial No. 199,018.

*To all whom it may concern:*

Be it known that I, THOMAS H. MONAHAN, a citizen of the United States, residing at Providence, in the county of Providence and State of Rhode Island, have invented certain new and useful Improvements in Dumping-Trucks, of which the following is a specification.

My invention relates to dumping trucks, preferably of metal, and particularly to the body and frame thereof and to the tilting or hoisting mechanism therefor.

The essential objects of my invention are adaptability of the body and its machine supporting frame for facile application to and removal from chassis or beds of various dimensions and construction without alteration or expense, whereby change and substitution is permitted and assembling is facilitated; to adapt the structure to carrying lumber and other material of greater length than the truck body without interfering with the driver; to insure an accurate, facile, and constantly controlled hoisting mechanism; and to attain these objects in a strong and inexpensive structure.

To the above ends essentially my invention consists in such parts and combinations of parts as fall within the scope of the appended claim.

In the accompanying drawings which form a part of this specification,

Figure 1 is a side elevation of a truck embodying my invention,

Fig. 2, a front end elevation of the same, omitting the chassis,

Fig. 3, a partial section on line 3—3 of Fig. 2,

Fig. 4, a plan taken on line 4—4 of Fig. 3, and

Fig. 5, a rear end view of the body.

Like reference characters indicate like parts throughout the views.

In the form of my invention herein shown 8 is the chassis or bed of a truck or vehicle and 9 the driver's seat, supported by wheels 10, only one of which is herein shown.

Upon the chassis is fixed a frame or support comprising longitudinally disposed side channel bars 12 and end cross bars 13 of angle iron. Upon the bottoms of the channel bars are forwardly extending plates 14 which furnish a bearing for the frame of sufficient amplitude to insure a proper rest and attaching area for a chassis of excessive length.

Resting on the portion of the frame described and projecting rearwardly therefrom is a metal box or body comprising a floor 16, integral side walls 17, and a forward end wall 18. The upper margins of all the walls are folded over as at 19 and 20 to strengthen and reinforce the body. The latter is further reinforced by outwardly curved straps 22 fixed by rivets 23 at their upper ends to the walls 17, and at their lower ends by rivets 24 to longitudinally disposed side channel bars 25 fixed to the floor of the body and resting on the bars 12.

The tail board 27 of the body has top and bottom projecting pivot pins 28 and 29 respectively, loosely seated between pairs of rearwardly projecting fingers 30 and 31, fast to strips 32 on the walls 17, all of which fingers are perforated to receive removable locking pins 33 and 34. By this construction the tail board may be opened by pivoting either at its top or bottom after the removal of the appropriate locking pins. Guides or attaching loops 36 upon the strips 32 are adapted to engage a retaining chain when desired. The body is hinged to the supporting frame in the present instance by upright plates 39 fast to the rear ends of the bars 12, provided with bearings 40 to receive trunnions 41 on the bars 25.

The portion of the supporting frame which embodies the hoisting mechanism comprises standards 43 of channel iron riveted at their lower ends to the sides of the bars 12 at points in advance of the body. Mounted in the tops of the supports are sheaves or pulleys 45, immediately below which is fixed a cross bar or rest 46 riveted at its ends to the supports. Guard plates 47 are located on the bar. Fixed by rivets or otherwise to an intermediate portion of the bar 13 is a casting 48 which has bearings 49 for one end of a shaft 50 which has its outer end journaled in an opening 51 in one of the uprights 43, and the projecting outer end of the shaft is squared to removably receive a crank 53. A worm 54 on the shaft between the bearings engages the teeth 55 of a gear 56 integral with a drum 57 fixed to a shaft 58 journaled at one end in a bearing 60 on the bar 13, and at its other end in a bearing 62 on a yoke 63 fast to the bar.

In conjunction with the described mechanism are employed hangers. These are two in number and are located near the ends of the front wall 18. Each comprises an attaching plate 66 riveted to the wall, having a forwardly projecting arm or portion 67 extending outside the adjacent upright, and a downwardly projecting arm or portion 68 upon the outer end of the arm 67, and extending below the chassis. The arm 68 is preferably of angle iron. In the lower end of each arm is a pin 70 to which are attached the ends of a cable 71. The cables pass from the pins 70 upwardly over the sheaves 45 and then converge downwardly and inwardly so that the central portion engages and is coiled around the drum 57.

The body is elevated for dumping purposes into some such position as shown in broken lines in Fig. 1, by manually turning the shaft 50 in one direction, and is lowered by reversing the direction of rotation of the shaft. The peculiar construction of the hoisting mechanism facilitates the elevation and depression of the body, and retains the body firmly in any angular position which it may assume.

The cross bar 46 affords a rigid and immovable support in a plane above the head of the driver for the projecting forward ends of pipes, boards, or other articles of greater length than the body.

It will be observed that the supporting frame 12, 13, and 14, carries not only the body or box but also the tilting mechanism and that these parts are so far independent of the chassis as to be readily applied or exchanged from one truck or vehicle to another.

I claim:

In a dumping truck, the combination with the chassis, of a supporting frame on the chassis, a dumping body pivotally mounted on the frame, standards on the frame in front of the body, sheaves upon the standards, a casting on the frame between the standards, bearings in the casting, a rotary shaft in the bearings, a worm on the shaft between the bearings, a yoke on the frame, a shaft mounted in the yoke and frame, a drum on the last mentioned shaft, a gear fast to the drum engaging the worm, hangers on the body adjacent the standards, and a flexible cable having an intermediate portion wound around the drum and radiating thence over the sheaves and having its ends engaging the hangers.

In testimony whereof I have affixed my signature.

THOMAS H. MONAHAN.